(12) United States Patent
Kitai

(10) Patent No.: US 8,102,577 B2
(45) Date of Patent: Jan. 24, 2012

(54) IMAGE READING APPARATUS AND READING CONTROL METHOD

(75) Inventor: Satoshi Kitai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1005 days.

(21) Appl. No.: 12/032,494

(22) Filed: Feb. 15, 2008

(65) Prior Publication Data

US 2008/0204825 A1   Aug. 28, 2008

(30) Foreign Application Priority Data

Feb. 28, 2007   (JP) ................ 2007-048297

(51) Int. Cl.
*H04N 1/04* (2006.01)
*H04N 1/40* (2006.01)

(52) U.S. Cl. ........ 358/474; 358/445; 358/483; 358/496; 358/497

(58) Field of Classification Search .......... 358/483, 358/482, 514, 474, 505; 250/208.1
See application file for complete search history.

(56) References Cited

FOREIGN PATENT DOCUMENTS

| JP | 11127303 A | * | 5/1999 |
| JP | 2002010144 A | * | 1/2002 |
| JP | 2002-209109 A | | 7/2002 |
| JP | 2002-281252 A | | 9/2002 |

* cited by examiner

*Primary Examiner* — Cheukfan Lee
(74) *Attorney, Agent, or Firm* — Canon U.S.A., Inc. IP Division

(57) ABSTRACT

An image reading apparatus reads a document on a line-by-line basis by using a reading unit. The image reading apparatus includes a modulation unit configured to modulate a clock signal at a predetermined period, a trigger signal generation unit configured to generate trigger signal for reading one line in the reading unit, a driving signal generation unit configured to generate a driving signal of the reading unit based on the clock signal output from the modulation unit and the trigger signal, and an output unit configured to change output timing of the driving signal within a range of the predetermined period each time the trigger signals are output predetermined times.

16 Claims, 11 Drawing Sheets

IMAGE READING APPARATUS AND READING CONTROL METHOD

BACKGROUND OF THE INVENTION

1. Field of the Invention

The present invention relates to an image reading apparatus (e.g., scanner, copying machine, facsimile) which includes a control unit that operates based on a frequency-spread clock signal, and to a reading control method.

2. Description of the Related Art

Various types of image reading apparatus have been proposed for scanning, copying and/or faxing documents, including a type of image reading apparatus in which a document placed on a document positioning plate is scanned by a line sensor, and another type of image reading apparatus which reads the document by feeding the document to a fixed line sensor.

In addition, a complementary metal-oxide semiconductor (CMOS) sensor, a charge-coupled device (CCD) sensor or the like may be used as a reading unit (reading device). Moreover, there are a number of types of light sources and methods for controlling a light source.

The image reading apparatus may include a circuit board which has a control circuit and a memory and the like. The control circuit performs various image processing operations such as drive control of the reading device, capturing the image data which has been read by the reading device and the like. In addition to this circuit board, the image reading apparatus is provided with another circuit board mounting a reading sensor for scanning a document. These two circuit boards are normally connected with each other through a flexible flat cable (FFC), harness or the like. Several driving signals are necessary for driving the reading unit, and they are supplied to the reading unit via a cable.

The above-mentioned image reading apparatus may not be capable of avoiding electromagnetic radiation (EMR) or electromagnetic interference (EMI) from the circuit board mounting the reading unit, a cable or the like. Further, if a faster operation of the reading unit is desired, the frequency of the driving signal in the reading unit may need to increase. As a result of increasing the operation speed of the reading unit, the level of EMR emitted from the image reading apparatus may become higher.

In order to reduce the level of EMR emitted by an image reading apparatus, for example, as in the above-mentioned situation, Japanese Patent Application Laid-Open No. 2002-281252 discusses the spectrum spread clock generating circuit provided in the reference clock signal generating portion. The reference clock signal is supplied to the control circuit and the memory. The spectrum spread clock generating circuit is referred to as a Spectrum Spread Clock Generator (SSCG), for example. The above-mentioned EMR is often a higher harmonic wave, which is the multiplied reference clock signal. Accordingly, it is possible to reduce the peak level of EMR by modulating the frequency of the reference clock with the SSCG. FIG. 8A is a view illustrating the modulation between frequencies $f_L$ and $f_H$. The period of the modulation is represented by T.

However, when an analog image signal obtained in the reading unit is processed based on the modulated reference clock signal, deviation in the timing due to the modulation may occur.

FIG. 8B is a view illustrating the timing at which an analog signal $S_1$ is sampled based on the clock signal. Sp represents a sampling signal. The frequency of a reference signal of the sampling signal Sp is also modulated. Accordingly, there is a deviation of a period $\Delta T$ between the sampling timing in the maximum frequency and that in the minimum frequency.

FIG. 9A is a view illustrating a phase relation between a timing signal of the CCD and frequency modulation in case where a reading operation is performed on a line-by-line basis by the CCD. The CCD is driven in synchronization with a signal SH which is output on a line-by-line basis. When an image is read out, a reading unit is moved at a constant speed. At this time, a signal SH is output at an interval corresponding to the moving speed.

Hereinafter, for ease of explanation, the reading of four lines from nth line to (n+3)th line and the phase of the first timing signal in each line are described. f91 represents the phase relation between the first timing signal of the nth line and the frequency modulation. The modulation phase from 0 to 180 degrees ($\pi$) is illustrated. f92 represents the phase relation between the first timing signal of (n+1)th line and the frequency modulation. Likewise, f93 and f94 represent similar relations in an (n+2)th line and in an (n+3)th line, respectively.

In this case, since the timing of the phase of the modulation is not controlled, a constant phase difference exists between the lines caused by the period of the signal SH and output timings of timing signals $\phi 1$ and $\phi 2$. In FIG. 9A, the phase difference of about T/4 exists between f91 and f92. The phase difference of about T/4 exists also between f92 and f93. As described above, the constant phase difference exists between the lines. While the first timing signal is described in this case, the second pulse and the successive pulses also have the similar relation because the timing signals $\phi 1$ and $\phi 2$ are output at a constant period.

Therefore, even if the document having a constant density is read over a plurality of lines, pseudo streaks can be recognized when the image is displayed on a monitor. These pseudo streaks are described in a schematic diagram illustrated in FIG. 9B. "A" represents a scanning direction, and "B" represents a direction in which the line sensor moves from a first line to an eighth line. In FIG. 9B, streaks represented by St appear in an oblique direction. These streaks illustrate the constant phase of the clock signal between lines.

In order to obscure the streaks in the read out image, according to Japanese Patent Application Laid-Open No. 2002-281252, a synchronization signal period of the main scanning is synchronized with a period of the frequency spread of the SSCG. Therefore, the SSCG is configured such that the same phase of a SSCG modulation signal is generated at a certain position from a reference point of the main scanning. In such a configuration, the positions of the streaks appearing in the image are fixed and the streaks are obscured.

However, when the SSCG is configured of the analog circuit, the frequency modulation period itself is often not maintained constant, which is caused by variation in a manufacturing process and a temperature characteristic. Therefore, it is difficult to stably control the phase and period of main scanning synchronization signal and SSCG modulation signal depending on the characteristics of the SSCG.

SUMMARY OF THE INVENTION

According to an aspect of the present invention, an embodiment is directed to an image reading apparatus for reading a document on a line-by-line basis by using a reading unit. The image reading apparatus includes, a modulation unit configured to modulate a clock signal at a predetermined period, a trigger signal generation unit configured to generate a trigger signal for reading one line in the reading unit, a driving signal generation unit configured to generate a driving signal of the reading unit based on the clock signal output from the modulation unit and the trigger signal, and an output unit configured to change output timing of the driving signal within a range of the predetermined period each time the trigger signals are output predetermined times.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
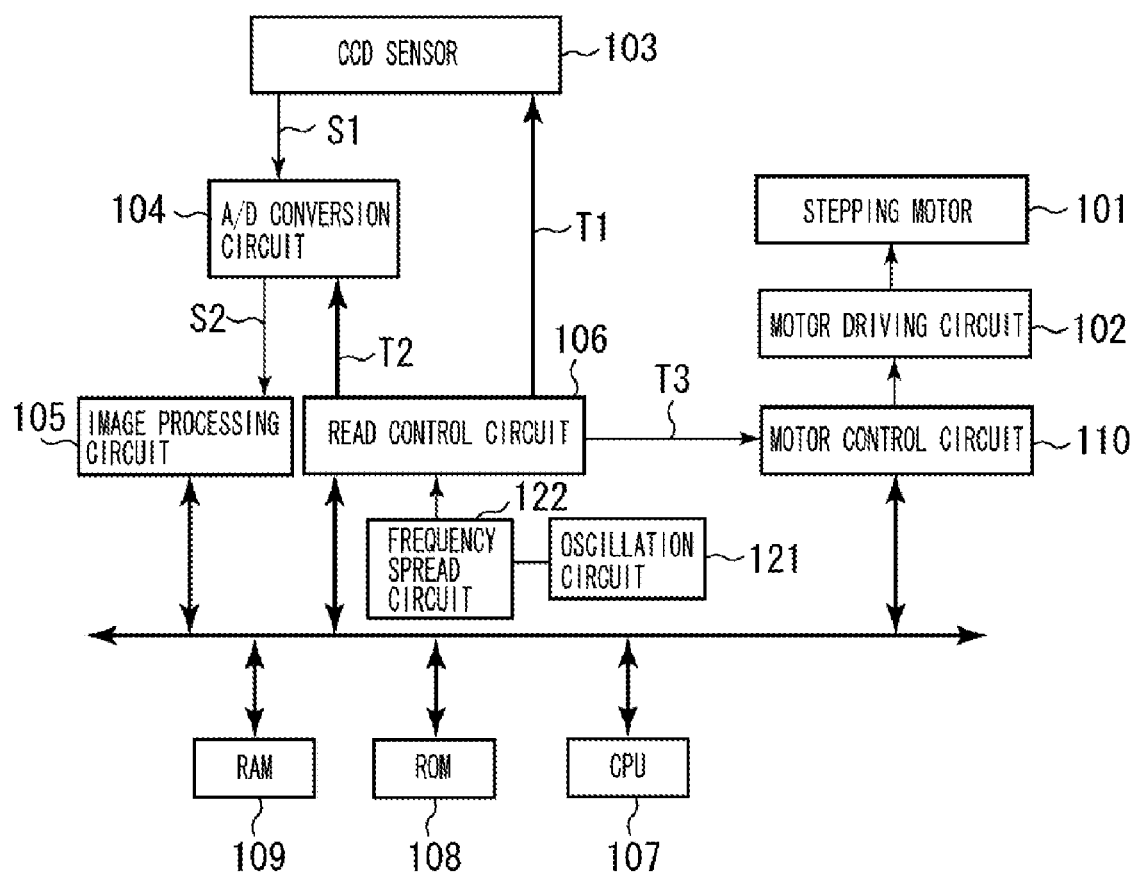
FIG. 1 is a block diagram illustrating an image reading apparatus according to an exemplary embodiment of the present invention.

FIG. 1 illustrates a configuration of an image reading apparatus according to the exemplary embodiments of the present invention. The image reading apparatus in FIG. 1 reads a document by moving an image reading unit and transfers the read data to an image processing circuit 105. After the data is processed in the image processing circuit 105, the data is stored in a RAM 109. A stepping motor 101 is a driving source that moves the image reading unit. A motor driving circuit 102 generates a driving signal of the stepping motor 101, while a motor control circuit 110 controls the driving of the stepping motor 101.

The image reading unit includes a CCD (or CMOS) sensor 103 as a photoelectric conversion unit. For instance, in the case of a flatbed-type scanner, a plurality of CCD sensors 103 (line sensor) is one-dimensionally arranged, and scans along the document under a document positioning glass plate. The CCD sensor 103 inputs a signal corresponding to an optical image of the document obtained by illumination with the light source. An image resolution of the CCD sensor 103 is 300 dots per inch (dpi). When 2500 pixels are used, the width of about 211.7 mm can be read in a main scanning direction.

The image signal read by the CCD sensor 103 is converted from the analog signal to a digital signal in the A/D conversion circuit 104 to be transferred to the image processing circuit 105. The image processing circuit 105 converts the image data to a predetermined format.

The image data subjected to a predetermined image processing in the image processing circuit 105 is stored in a memory, or sent to a host device through an interface such as a Universal Serial Bus (USB).

Next, a control signal output from a read control circuit 106 is described. The read control circuit 106 (timing signal generating circuit) generates a control signal T1 to be output to the CCD sensor 103, a control signal T2 to be output to the A/D conversion circuit 104, and a control signal T3 to be output to a motor control circuit 310. These control signals T1, T2 and T3 are generated based on a modulated clock signal, which will be described below.

These control signals T1, T2 and T3 are generic terms for signals that are output to each circuit. For instance, the control signal T1 includes signals SH, $\phi1$, $\phi2$, and L. Meanwhile, the control signal T2 includes a signal Sp. The control signal T3 includes a signal Mt.

The above-described read control circuit 106, image processing circuit 105, and motor control circuit 110 are configured as one application specific integrated circuit (ASIC).

Next, the clock signal and the frequency modulation are described. In the present exemplary embodiment, a clock generator 121 (liquid crystal oscillator) generates the clock signal having a frequency of 30 MHz. A frequency spread circuit 122 (spectrum diffusion unit) generates the clock signal having a frequency of 96 MHz based on the clock signal generated by the clock generator 121. The frequency spread circuit 122 modulates the clock signal at 94.08 MHz to 97.92 MHz. Then, the clock signal having a frequency of 94.08 MHz to 97.92 MH is output. In this case, the modulation frequency is 20 kHz. Namely, the frequency of the modulated clock signal is modulated at a period of 50 microseconds. This modulated clock signal is supplied to each integrated circuit or circuit element provided in the image reading apparatus. Also the read control circuit 106 operates based on this modulated clock signal.

Next, a CPU 107 is described. The CPU 107 controls the CCD sensor 103, the A/D conversion circuit 104, the image processing circuit 105, the read control circuit 106, and the motor control circuit 110. The CPU 107 controls them according to a control program stored in a ROM 108, and uses a RAM 109 as a work area.

In the above configuration, when a read start command is generated based on an instruction from the outside, the CPU 107 outputs the read start instruction to each circuit. The read start command is generated, for example, when a user pushes a key switch of an operating unit (not illustrated).

In response thereto, the motor control circuit 110 controls the stepping motor 101 according to a predetermined speed table. The acceleration control, constant speed control, and deceleration control of the stepping motor 101 are performed by the motor control circuit 110 to move the image reading unit. In the present exemplary embodiment, a timing signal Mt for driving the stepping motor 101 by one pulse is output.

When the image reading unit reaches a predetermined read start position after the moving state thereof is transferred to a constant speed region (constant speed control region), the CPU 107 causes the control circuit 106 to start the reading processing. In response to the instruction from the CPU 107, the control circuit 106 outputs the control signal to the CCD sensor 103 and the A/D conversion circuit 104. The image reading processing is performed until the image reading unit reaches a predetermined read finish position.

When the above reading processing is performed, the image reading unit reads the image of one line (about 211 mm). If the image reading unit moves about 297 mm, a document of A4 size can be read.

The read control circuit 106 generates the timing signal Mt in synchronization with a main scanning line synchronization signal SH. Therefore, the reading position in a sub scanning direction is not varied and the image can be favorably read also in the sub scanning direction.

Figure 2:
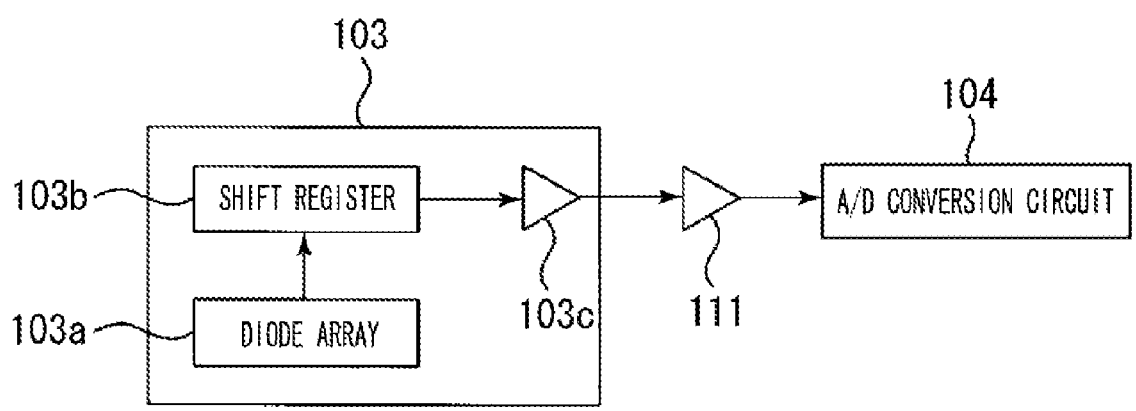
FIG. 2 is a view illustrating a flow of a signal from a CCD sensor to an A/D converting circuit according to the exemplary embodiment of the present invention.

FIG. 2 is a view illustrating a flow of a signal from the CCD sensor 103 to the A/D conversion circuit 104. The analog signal output from the CCD sensor 103 is sent to the A/D conversion circuit 104 through an amplifier 111.

The CCD sensor 103 includes a diode array (photoelectric conversion element) 103a, a shift register (charge transfer shift register) 103b, and output unit 103c. The shift register 103b is operated by two kinds of pulse signals ($\phi1$, $\phi2$). As described below, these pulse signals are expressed also as CCD driving clock signals ($\phi1$, $\phi2$).

The transmission from the diode array 103a to the shift register 103b is performed in synchronization with the main scanning line synchronization signal SH. The diode array 103a accumulates electric charge of one line. The electric charge of one line is synchronized with one transfer signal, and parallel transmitted at a time to the shift register 103b. Thereafter, the shift register 103b synchronizes with the CCD driving clock signals ($\phi1$, $\phi2$) to serially transmit the data to the output unit 103c.

Figure 3:
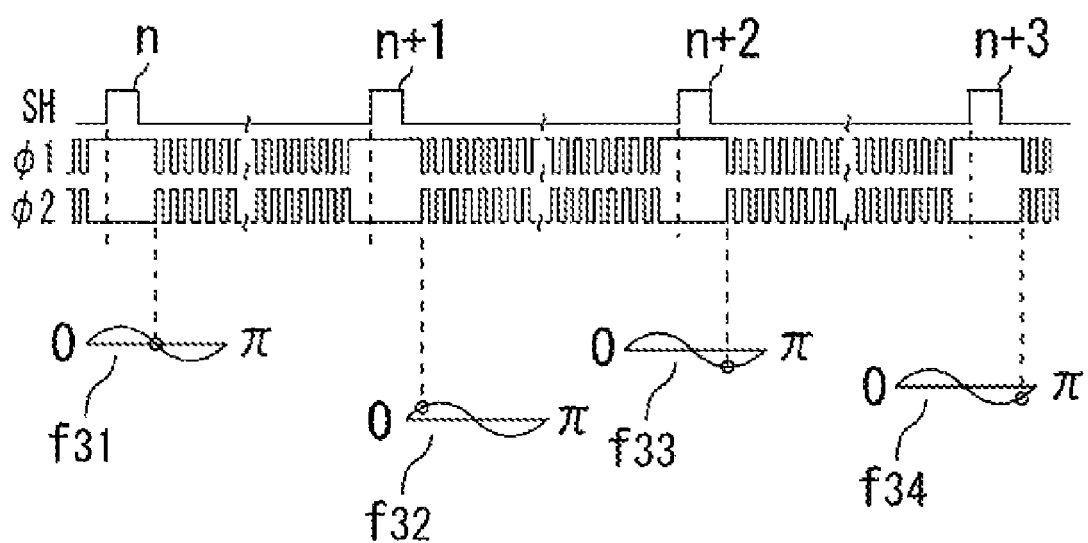
FIG. 3 is a view illustrating timing in reading out process according to an exemplary embodiment of the present invention.
Figure 8A:
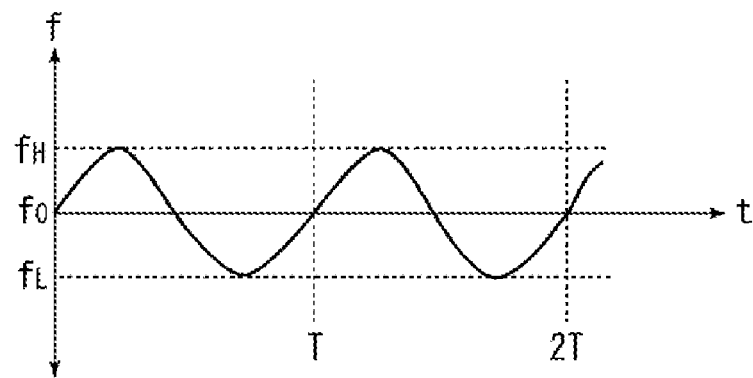
FIGS. 8A and 8B are, respectively, a view illustrating modulation of frequency of a clock signal and timing of an analog signal.
Figure 8B:
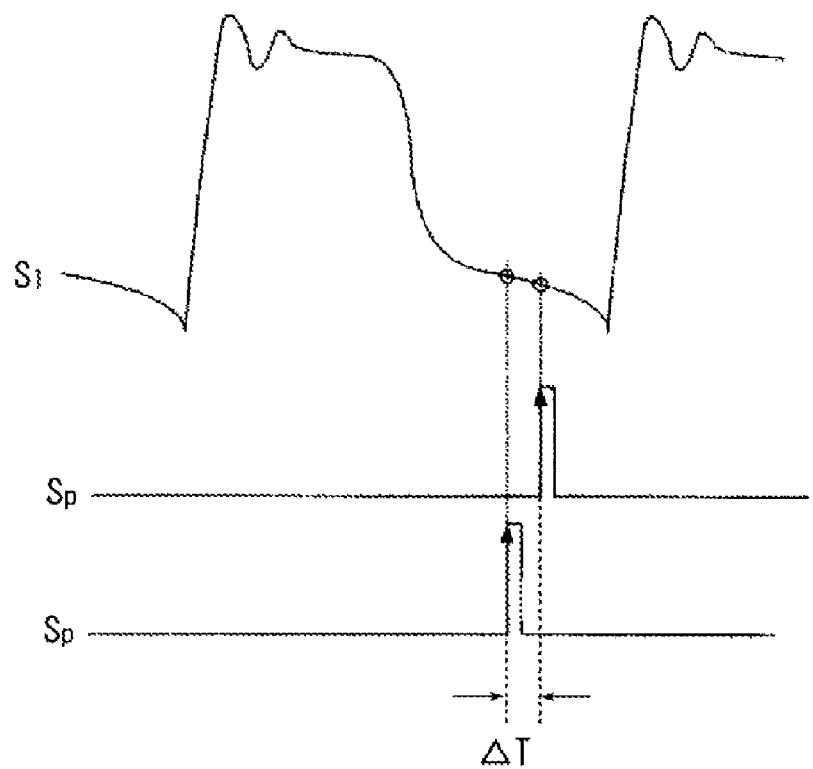
Figure 9A:
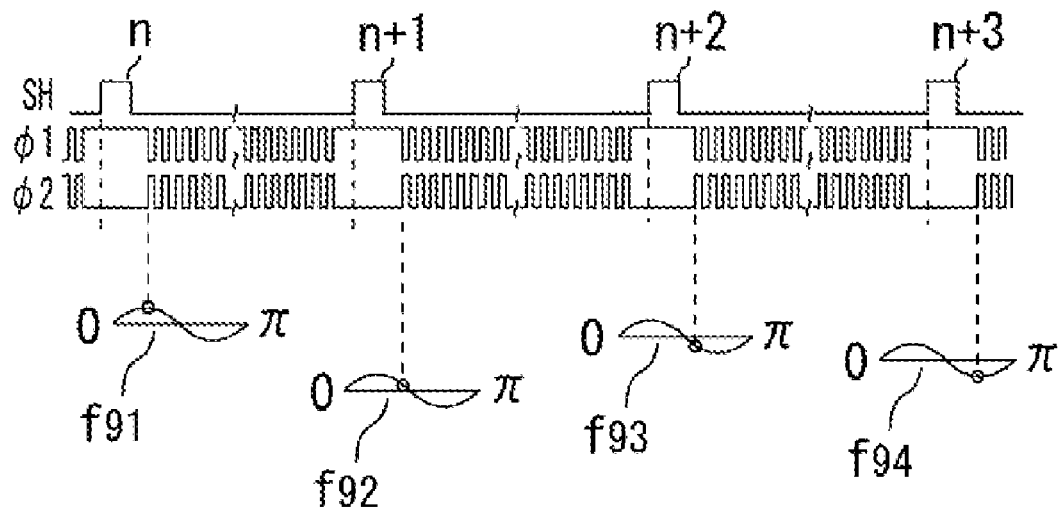
FIGS. 9A and 9B are, respectively, a view illustrating timing in the conventional reading process and a schematic diagram of streaks generated by modulation.
Figure 9B:
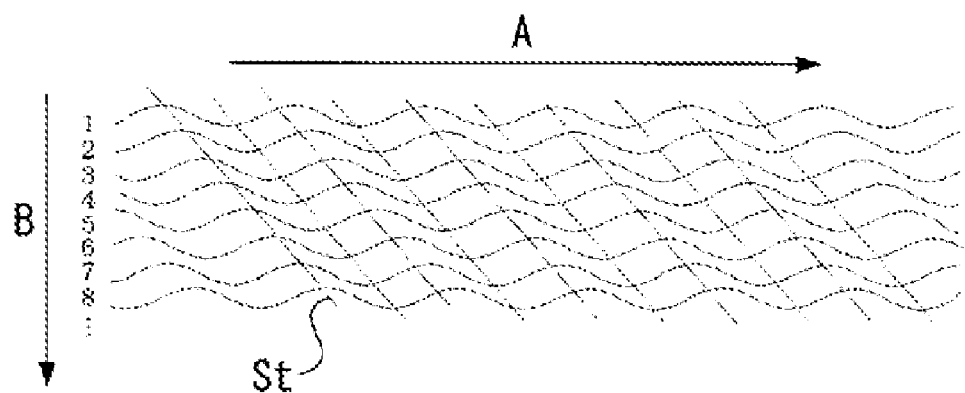

Next, the read control circuit 106 in the image reading processing is described. FIG. 3 is a view illustrating a relation between the timing of the pulse signals ($\phi1$, $\phi2$) and the phase of the clock signal. The pulse signals ($\phi1$, $\phi2$) are output in synchronization with the main scanning line synchronization signal SH. f31 to f34 are explanatory views similar to f91 to f94 described in FIG. 9A.

f31 represents the relation between the first pulse signals ($\phi1$, $\phi2$) of an nth line and the phase of the frequency modulation. f32 represents the relation between the first pulse signals ($\phi1$, $\phi2$) of an (n+1)th line and the phase of the frequency modulation. f33 and f34 represent similar relations. In the first pulse signals ($\phi1$, $\phi2$) of each line, the relation between them and the phase is random. Therefore, the pulse signals ($\phi1$, $\phi2$) of the second pulse and the successive pulses become random in each line. Accordingly, the streaks described in FIG. 8B are obscured.

The read control circuit 106 includes a timing changing unit configured to change timing with the phase in a random manner. The read control circuit 106 changes the timing in each line. The read control circuit 106, for example, may provide a plurality of information about delay time in a table. Instead of this method, the read control circuit 106 may be provided with a random number generating circuit.

The maximum of the delay time may be a time (50 μm) equivalent to the modulation period of the frequency spread circuit 122. Accordingly, the interval at which the main scanning line synchronization signal SH is output is determined considering this maximum of the delay time.

First Exemplary Embodiment

The control of the image reading processing is described with reference to FIG. 4. The main scanning line synchronization signal SH and the motor timing signal Mt are generated in each line. In synchronization with one output of the motor timing signal Mt, the stepping motor 101 moves by one pulse. Thus, the CCD sensor 103 moves by one line each time one line is read by the CCD sensor 103.

The CCD sensor 103 operates in synchronization with the CCD driving clock signals ($\phi1$, $\phi2$). The CCD driving clock signals ($\phi1$, $\phi2$) correspond to the pulse signals described in FIG. 3. The frequency of the CCD driving clock signals ($\phi1$, $\phi2$) is 3 MHz (period: 333 nsec). The CCD driving clock signals ($\phi1$, $\phi2$) are output by 3000 pulses in synchronization with the main scanning line synchronization signal SH.

Figure 4:
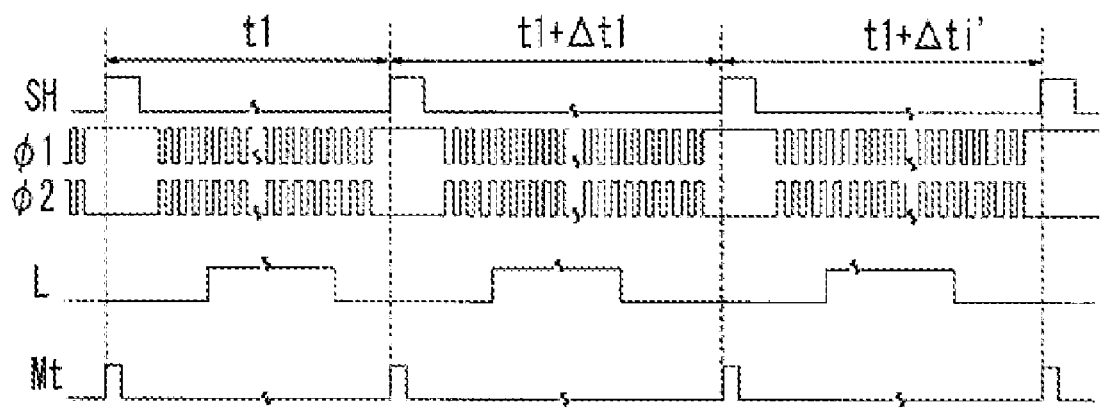
FIG. 4 is a view illustrating timing in the reading out process according to a first exemplary embodiment of the present invention.

In FIG. 4, the interval between the signal SH in an nth line and that in an (n+1)th line is t1+Δt1. Meanwhile, the interval between the signal SH in the (n+1)th line and that in an (n+2)th line is t1+Δt1'. As described in FIG. 3, the intervals Δt1 and Δt1' are random values to the phase of the frequency modulation. Namely, the CCD driving clock signals ($\phi1$, $\phi2$) are generated in each line at timing random to the phase of the frequency modulation. The streaks described in FIG. 8B are obscured in the image read in the above configuration.

Second Exemplary Embodiment

Next, the image reading processing in the second embodiment is described with reference to FIG. 5. The points are described which are different from the first exemplary embodiment. The description of the points similar to the first embodiment will not be repeated.

Figure 5:
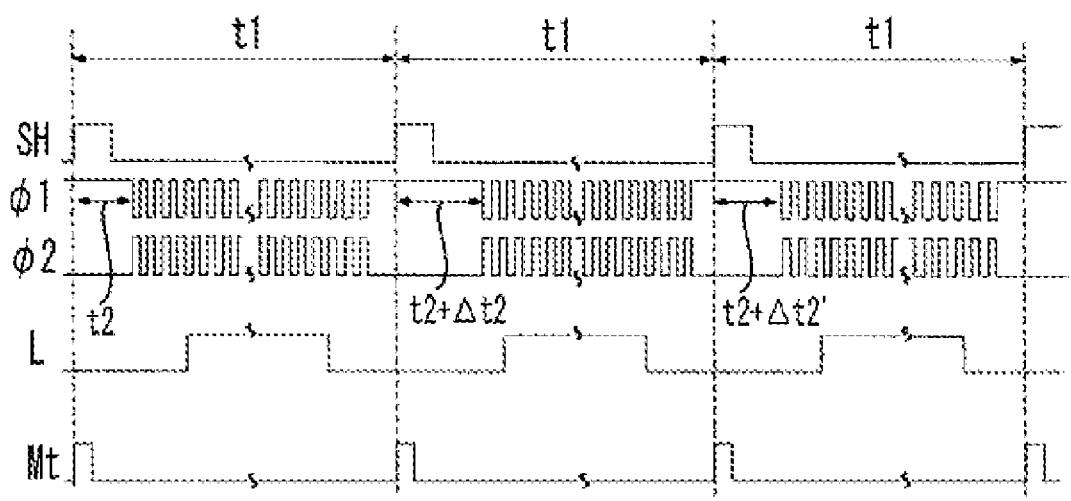
FIG. 5 is a view illustrating timing in the reading out process according to a second exemplary embodiment of the present invention.

As illustrated in FIG. 5, start timing of CCD driving clock signals ($\phi1$, $\phi2$) is changed in each line. The CCD driving clock signals ($\phi1$, $\phi2$) are output a period t2 after the main scanning line synchronization signal SH is output. In the next line, the CCD driving clock signals ($\phi1$, $\phi2$) are output a period t2+Δt2 after the main scanning line synchronization signal SH is output. In the following line, the CCD driving clock signals ($\phi1$, $\phi2$) are output a period t2+Δt2' after the main scanning line synchronization signal SH is output. These controls are performed by the read control circuit 106. The periods Δt2 and Δt2' are random values.

Third Exemplary Embodiment

In the above embodiments, a driving source for moving the image reading unit is the stepping motor. Next, in the third embodiment, the driving source for moving the image reading unit that is a direct current (DC) motor, is described with reference to FIG. 6.

Figure 6:
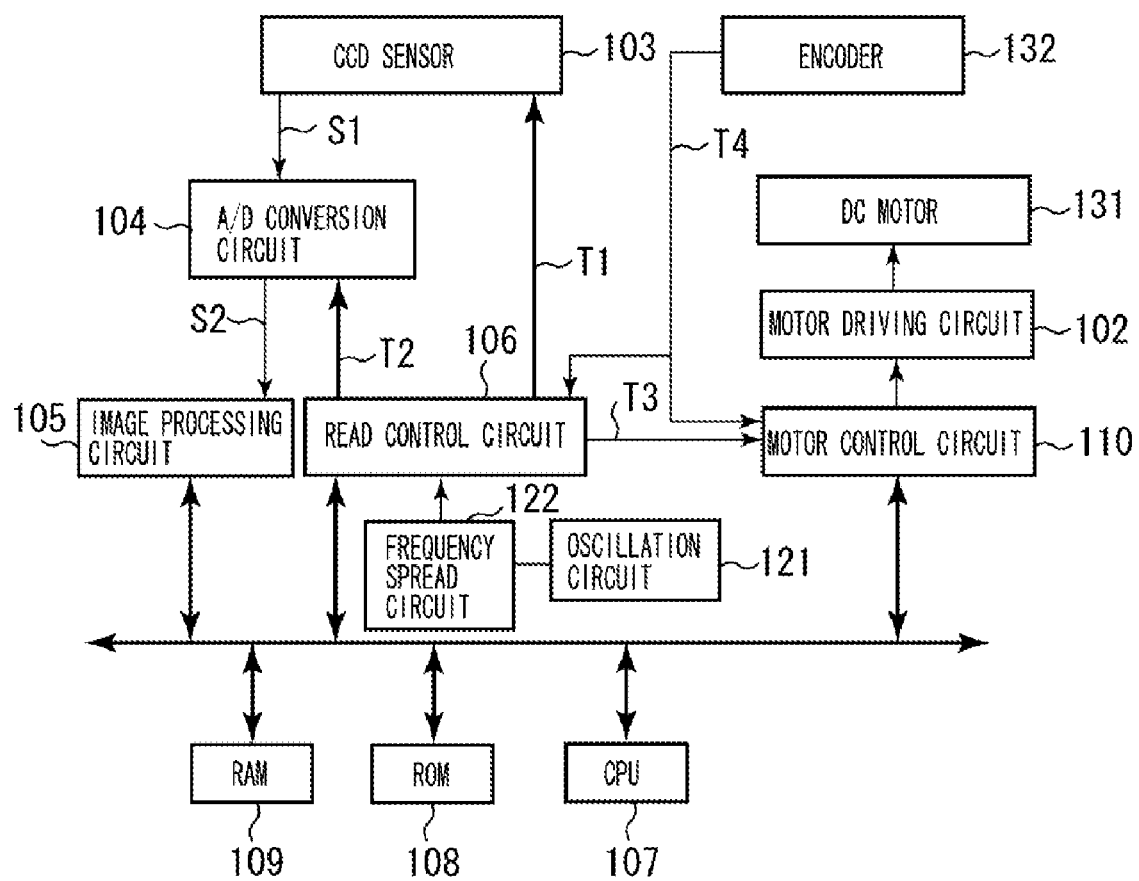
FIG. 6 is a block diagram of the image reading apparatus in a third exemplary embodiment of the present invention.

In FIG. 6, the points different from the configuration of FIG. 1 are described. The points similar to the first exemplary embodiment will not be repeated.

Unlike FIG. 1, the motor is a DC motor 131 and includes an encoder 132. The encoder 132, for example, is a linear encoder, and outputs a signal (information) T4 in response to the movement of the image reading unit in the sub scanning direction. The motor control circuit 110 controls the DC motor 131 based on the signal T4. In addition, the read control circuit 106 also controls the image reading unit based on the signal T4.

The image reading processing is described with reference to FIG. 7. The signal T4 is output as the reading unit moves. The main scanning line synchronization signal SH is output in synchronization with the signal T4. The CCD driving clock signals ($\phi1$, $\phi2$) are output in synchronization with the output of the main scanning line synchronization signal SH.

Figure 7:
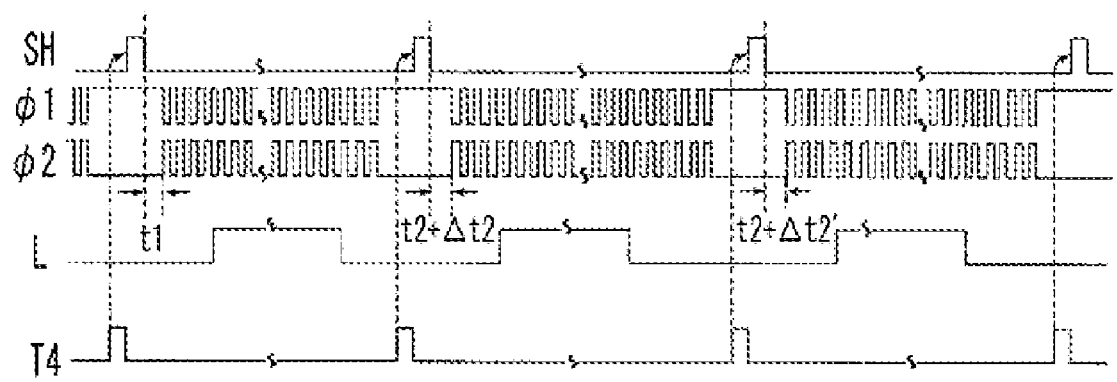
FIG. 7 is a view illustrating timing in the reading out process according to the third exemplary embodiment of the present invention.

As illustrated in FIG. 7, the start timing of the CCD driving clock signals ($\phi1$, $\phi2$) is changed in each line. The CCD driving clock signals ($\phi1$, $\phi2$) are output a period t2 after the main scanning line synchronization signal SH is output. In the next line, the CCD driving clock signals ($\phi1$, $\phi2$) are output a period t2+$\Delta$t2 after the main scanning line synchronization signal SH is output. In the following line, the CCD driving clock signals ($\phi1$, $\phi2$) are output a period t2+$\Delta$t2' after the main scanning line synchronization signal SH is output. These controls are performed by the read control circuit 106. The periods $\Delta$t2 and $\Delta$t2' are random values.

(Image Reading Device)

Next, the image reading device according to the exemplary embodiment of the present invention is described.

Figure 10:
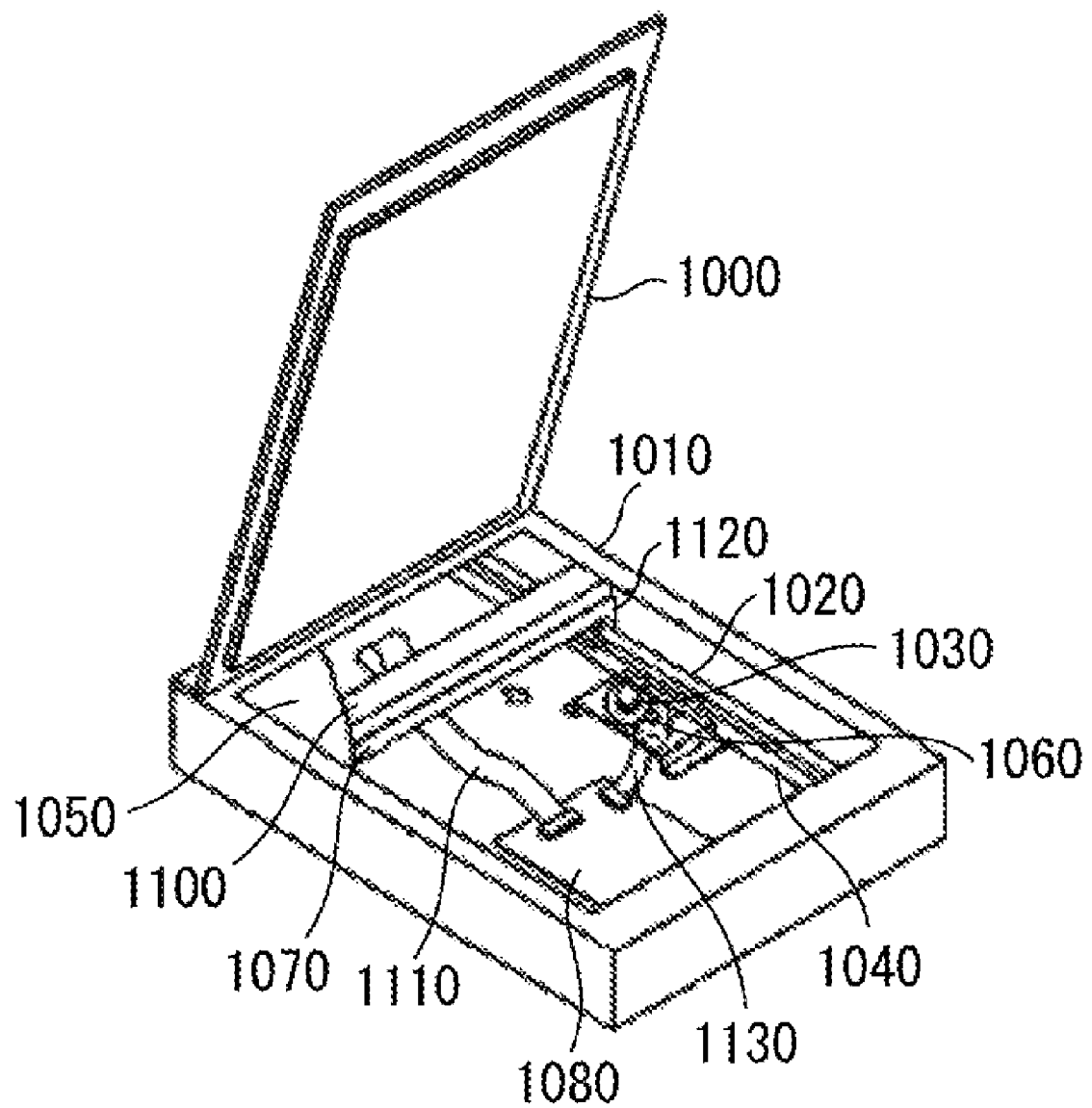
FIG. 10 is a perspective view illustrating the image reading apparatus according to an exemplary embodiment of the present invention.

FIG. 10 illustrates an image reading device for reading an image while a line sensor scans a document placed on a document positioning plate.

The document is placed on a document platen glass 1050. Reference numeral 1000 denotes a cover. A frame body 1010 doubles as an outer cover. A reading unit 1100 is driven by a motor 1060 to be guided by a guide shaft 1020, and performs scanning in a direction A indicated by an arrow along the document platen glass 1050. The reading unit 1100 is disposed on a holder 1070. A slider 1120 is provided in the holder 1070. Reference numerals 1040 and 1030 denote a drive wire and a pulley, respectively. Reference numeral 1080 denotes a circuit board. Reference numerals 1110 and 1130 denote flat cables.

Figure 11:
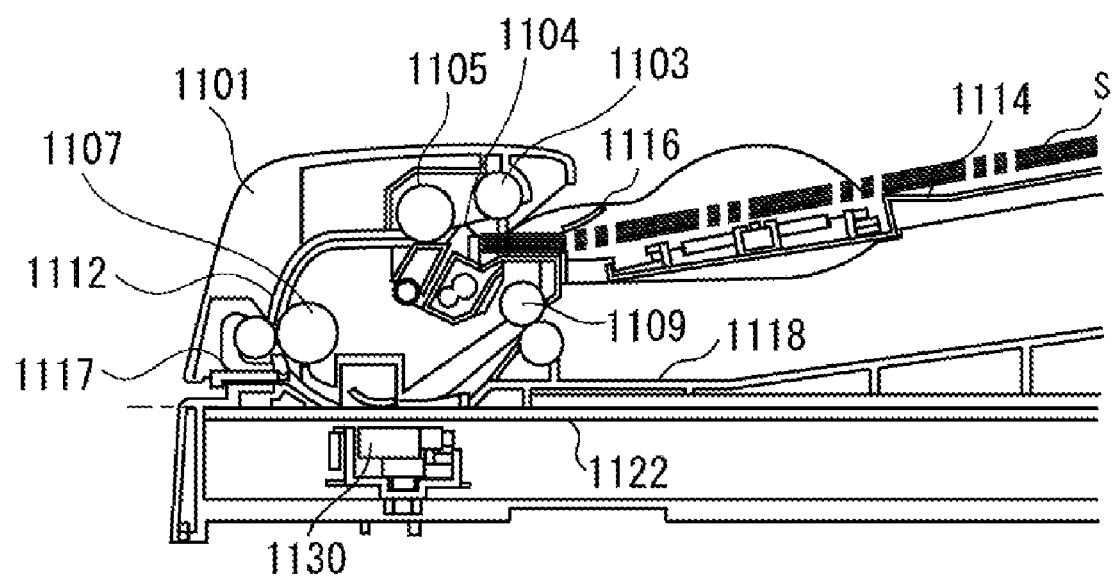
FIG. 11 is a cross-sectional view illustrating the image reading apparatus according to an exemplary embodiment of the present invention.

FIG. 11 is a major cross-sectional view of the image reading apparatus that reads the image by feeding the document to a fixed reading unit. As illustrated in FIG. 11, a document reading feeding portion 1101 has a document feeding path (hereinafter referred to as a U-turn path) 1112 of an approximately U-like shape.

The U-turn path 1112 includes a separation roller 1105, a separation pad 1104, a document presence/absence sensor 1116, a first feeding roller 1107 that feeds a document S, a document edge sensor 1117, and the like. A driving source that feeds the document in this automatic paper-feeding reading apparatus is a motor (not illustrated).

The document reading feeding portion 1101 includes a document placing table (document placing tray) 1114 that is connected to an upstream end side of the U-turn path 1112 and a document discharging tray 1118 at a downstream end side thereof.

In FIG. 11, the document S is fed in a left direction, and u-turned passing through the U-turn path 1112. Thereafter, the document S is fed in a right direction to be discharged into the document discharging tray 1118.

Meanwhile, the upstream side of the U-turn path 1112 has the separation roller 1105 and the separation pad 1104 which separate the document S picked up by a pick-up roller 1103 to one sheet. The separation roller 1105 and the separation pad 1104 are pushed against each other. The downstream side of the U-turn path 1112 has a second feeding roller 1109 that discharges the document S into the document discharging tray 1118.

A contact type image sensor 1130 disposed through the document reading feeding portion 1101 and a glass 1122 reads image information by forming the image on a sensor element while the document S is irradiated with light emitted from an LED array serving as a light source.

Embodiment

The present invention is not limited to the numeric values used in the description of the embodiment. For instance, although in this embodiment, the start timing of the CCD driving clock signals ($\phi1$, $\phi2$) is changed in each line, it may be changed in each of a plurality of lines.

The image resolution in the image reading unit is not limited to 300 dpi. The resolution may be 600 dpi, 1200 dpi, or the like.

In addition, the frequency of the reference clock signal is not limited to 30 MHz, and the frequency modulation is also not limited to 20 kHz. The frequency of the CCD driving clock signal is not limited to 3 MHz, either.

Moreover, the configuration of the image reading apparatus is not limited to that described in the embodiment. For instance, in the present exemplary embodiment, although the motor control circuit and the read control circuit are different and independent control circuits, they may be an integrated control circuit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-048297 filed Feb. 28, 2007, which is hereby incorporated by reference herein in its entirety.

What is claimed is:

1. An image reading apparatus for reading a document by using a reading unit, the image reading apparatus comprising:
   a clock signal generation unit configured to generate a clock signal;
   a modulation unit configured to modulate a frequency of the clock signal at a predetermined period to output a modulated clock signal;
   a trigger signal generation unit configured to generate a trigger signal for reading one line in the reading unit;
   a driving signal generation unit configured to generate a driving signal of the reading unit based on the modulated clock signal and the trigger signal; and
   an output unit configured to change an output timing of the driving signal within a range of the predetermined period.

2. The image reading apparatus according to claim 1, wherein the driving signal drives a sensor provided in the reading unit.

3. The image reading apparatus according to claim 1, wherein the output unit selects the output timing in a random manner.

4. The image reading apparatus according to claim 1, further comprising:
   a document positioning plate; and
   a driving source that slidably moves the reading unit disposed under the document positioning plate so as to enable the reading unit to scan a document placed on the document positioning plate, wherein the reading unit includes a sensor capable of generating signals corresponding to an optical image of the document obtained by illumination with a light source.

5. The image reading apparatus according to claim 1, further comprising:
   a document feeding path; and a driving source that feeds a document through the document feeding path, wherein the reading unit includes a sensor capable of generating signals corresponding to an optical image of the document, as the document is fed through the document feeding path, obtained by illumination with a light source.

6. An image reading apparatus for reading a document by using a reading unit, the image reading apparatus comprising:
a clock signal generation unit configured to generate a clock signal;
a modulation unit configured to modulate a frequency of the clock signal at a predetermined period to output a modulated clock signal;
a trigger signal generation unit configured to generate a trigger signal for reading one line in the reading unit; and
a driving signal generation unit configured to generate a driving signal of the reading unit based on the modulated clock signal and the trigger signal,
wherein the trigger signal generation unit changes an output timing of the trigger signal within a range of the predetermined period.

7. The image reading apparatus according to claim 6, wherein the driving signal drives a sensor provided in the reading unit.

8. The image reading apparatus according to claim 6, wherein the output unit changes the output timing in a random manner.

9. The image reading apparatus according to claim 6, further comprising:
a document positioning plate; and
a driving source that slidably moves the reading unit disposed under the document positioning plate so as to enable the reading unit to scan a document placed on the document positioning plate, wherein the reading unit includes a sensor capable of generating signals corresponding to an optical image of the document obtained by illumination with a light source.

10. The image reading apparatus according to claim 6, further comprising:
a document feeding path; and
a driving source that feeds a document through the document feeding path, wherein the reading unit includes a sensor capable of generating signals corresponding to an optical image of the document, as the document is fed through the document feeding path, obtained by illumination with a light source.

11. A method for reading a document by using a reading unit, the method comprising:
generating a clock signal of which frequency is modulated at a predetermined period;
generating a trigger signal for reading one line in the reading unit;
generating a driving signal of the reading unit based on the clock signal and the trigger signal; and
changing an output timing of the driving signal within a range of the predetermined period.

12. The method according to claim 11, further comprising:
positioning a document on a document positioning plate; and
scanning the document positioned on the document positioning plate by slidably moving the reading unit disposed under the document positioning plate, wherein the reading unit includes a sensor capable of generating signals corresponding to an optical image of the document obtained by illumination with a light source.

13. The method according to claim 11, further comprising:
feeding a document through a document feeding path; and
using a sensor provided in the reading unit to generate signals corresponding to an optical image of the document, as the document is fed through the document feeding path, obtained by illumination with a light source.

14. A method for reading a document by using a reading unit, the method comprising:
generating a clock signal of which frequency is modulated at a predetermined period;
generating a trigger signal for reading one line in the reading unit;
generating a driving signal of the reading unit based on the clock signal and the trigger signal; and
changing an output timing of the trigger signal within a range of the predetermined period.

15. The method according to claim 14, further comprising:
positioning a document on a document positioning plate; and
scanning the document positioned on the document positioning plate by slidably moving the reading unit disposed under the document positioning plate, wherein the reading unit includes a sensor capable of generating signals corresponding to an optical image of the document obtained by illumination with a light source.

16. The method according to claim 14, further comprising:
feeding a document through a document feeding path; and
using a sensor provided in the reading unit to generate signals corresponding to an optical image of the document, as the document is fed through the document feeding path, obtained by illumination with a light source.

* * * * *